(12) United States Patent
Kim (10) Patent No.: US 8,724,740 B2
(45) Date of Patent: May 13, 2014

(54) SYSTEMS AND METHODS FOR REDUCING UPLINK RESOURCES TO PROVIDE CHANNEL PERFORMANCE FEEDBACK FOR ADJUSTMENT OF DOWNLINK MIMO CHANNEL DATA RATES

(75) Inventor: Byoung-Hoon Kim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1402 days.

(21) Appl. No.: 11/508,386

(22) Filed: Aug. 22, 2006

(65) Prior Publication Data

US 2007/0105503 A1 May 10, 2007

Related U.S. Application Data

(63) Continuation-in-part of application No. 11/078,470, filed on Mar. 11, 2005.

(51) Int. Cl.
*H04B 1/00* (2006.01)

(52) U.S. Cl.
USPC ............ 375/316; 375/260; 375/296; 455/69; 455/70

(58) Field of Classification Search
CPC .. H04B 7/0417; H04B 7/0632; H04B 7/0641; H04B 7/0658; H04L 1/0026; H04L 1/0029
USPC ........... 375/260, 295, 296, 316, 346; 455/60, 455/69, 70
See application file for complete search history.

(56) References Cited

U.S. PATENT DOCUMENTS

| | | | |
|---|---|---|---|
| 5,852,630 A | * | 12/1998 | Langberg et al. ............. 375/219 |
| 6,000,054 A | | 12/1999 | Bahr et al. |
| 6,084,919 A | | 7/2000 | Kleider et al. |

(Continued)

FOREIGN PATENT DOCUMENTS

| | | |
|---|---|---|
| AR | 050795 A1 | 11/2006 |
| CA | 2400517 | 4/2003 |

(Continued)

OTHER PUBLICATIONS

International Search Report—PCT/US07/076480—International Search Authority, European Patent Office, Jan. 21, 2008.

(Continued)

*Primary Examiner* — Shuwang Liu
*Assistant Examiner* — David Huang
(74) *Attorney, Agent, or Firm* — Paul Kuo (57) ABSTRACT

Systems and methods for improving the performance of a MIMO wireless communication system by reducing the amount of uplink resources that are needed to provide channel performance feedback for the adjustment of data rates on the downlink MIMO channels. In one embodiment, a method comprises encoding each of a set of data streams according to corresponding data rates, permuting the data streams on a set of MIMO channels according to a full permutation of combinations, transmitting the permuted data streams, receiving the permuted data streams, decoding and determining an SNR for each of the data streams, computing a condensed SNR metric for the set of data streams, providing the condensed metric as feedback, determining a set of individual SNR metrics for the data streams based on the condensed SNR metric, and adjusting the data rates at which the data streams are encoded based on the individual SNR metrics.

16 Claims, 7 Drawing Sheets

(56) References Cited

U.S. PATENT DOCUMENTS

| | | | |
|---|---|---|---|
| 6,542,485 | B1 | 4/2003 | Mujtaba |
| 6,802,035 | B2 | 10/2004 | Catreux et al. |
| 6,850,481 | B2 | 2/2005 | Wu et al. |
| 6,888,809 | B1 | 5/2005 | Foschini et al. |
| 6,907,269 | B2 | 6/2005 | Yamaguchi et al. |
| 6,970,682 | B2 | 11/2005 | Crilly, Jr. et al. |
| 7,020,446 | B2 | 3/2006 | Mehta et al. |
| 7,039,356 | B2 | 5/2006 | Nguyen |
| 7,103,384 | B2 | 9/2006 | Chun |
| 7,184,713 | B2 | 2/2007 | Kadous et al. |
| 7,248,841 | B2 | 7/2007 | Agee et al. |
| 7,260,366 | B2 | 8/2007 | Lee et al. |
| 7,280,622 | B2 | 10/2007 | Love et al. |
| 7,298,805 | B2 | 11/2007 | Walton et al. |
| 7,321,563 | B2 | 1/2008 | Kim et al. |
| 7,412,212 | B2 | 8/2008 | Hottinen |
| 7,508,880 | B2 | 3/2009 | Yun et al. |
| 7,711,330 | B2 | 5/2010 | Yang et al. |
| 8,073,068 | B2 | 12/2011 | Kim et al. |
| 2003/0137955 | A1 | 7/2003 | Kim et al. |
| 2003/0185310 | A1 | 10/2003 | Ketchum et al. |
| 2003/0235255 | A1 | 12/2003 | Ketchum et al. |
| 2004/0018818 | A1* | 1/2004 | Hottinen et al. ............... 455/78 |
| 2004/0052317 | A1* | 3/2004 | Love et al. ................... 375/340 |
| 2004/0120411 | A1 | 6/2004 | Walton et al. |
| 2004/0136349 | A1 | 7/2004 | Walton et al. |
| 2004/0141466 | A1* | 7/2004 | Kim et al. .................... 370/252 |
| 2004/0190640 | A1 | 9/2004 | Dubuc et al. |
| 2004/0267778 | A1 | 12/2004 | Rudolph et al. |
| 2005/0009476 | A1 | 1/2005 | Wu et al. |
| 2005/0031044 | A1 | 2/2005 | Gesbert et al. |
| 2005/0047517 | A1 | 3/2005 | Georgios et al. |
| 2005/0052991 | A1 | 3/2005 | Kadous |
| 2005/0128983 | A1 | 6/2005 | Kim et al. |
| 2005/0135499 | A1 | 6/2005 | Nam et al. |
| 2005/0157807 | A1 | 7/2005 | Shim et al. |
| 2005/0220211 | A1* | 10/2005 | Shim et al. ................... 375/267 |
| 2005/0276347 | A1 | 12/2005 | Mujtaba et al. |
| 2005/0288014 | A1 | 12/2005 | Rajkotia et al. |
| 2006/0023745 | A1 | 2/2006 | Koo et al. |
| 2006/0050770 | A1 | 3/2006 | Wallace et al. |
| 2006/0067421 | A1 | 3/2006 | Walton et al. |
| 2006/0093062 | A1 | 5/2006 | Yun et al. |
| 2006/0111054 | A1 | 5/2006 | Pan et al. |
| 2006/0115014 | A1 | 6/2006 | Jeong et al. |
| 2006/0205357 | A1 | 9/2006 | Kim |
| 2006/0209980 | A1 | 9/2006 | Kim et al. |
| 2006/0286974 | A1 | 12/2006 | Gore et al. |
| 2007/0041457 | A1 | 2/2007 | Kadous et al. |
| 2007/0254652 | A1 | 11/2007 | Khan et al. |
| 2008/0080641 | A1 | 4/2008 | Kim |
| 2008/0209115 | A1 | 8/2008 | Maeda et al. |

FOREIGN PATENT DOCUMENTS

| | | |
|---|---|---|
| EP | 1376920 | 1/2004 |
| EP | 1655874 | 5/2006 |
| JP | 2002217752 | 8/2002 |
| JP | 2004320434 | 11/2004 |
| JP | 2005509359 | 4/2005 |
| JP | 2005223450 | 8/2005 |
| JP | 20050535167 | 11/2005 |
| JP | 2006520109 | 8/2006 |
| JP | 2007509534 | 4/2007 |
| JP | 2007512760 | 5/2007 |
| JP | 2008521353 | 6/2008 |
| JP | 2008526122 | 7/2008 |
| JP | 2009506656 | 2/2009 |
| JP | 4819897 | 9/2011 |
| JP | 2012100288 | 5/2012 |
| KR | 20030062135 A | 7/2003 |
| KR | 20040073551 | 8/2004 |
| KR | 20050015731 | 2/2005 |
| KR | 20060092991 A | 8/2006 |
| RU | 2208911 | 7/2003 |
| RU | 2257609 | 7/2005 |
| RU | 2264010 | 11/2005 |
| TW | 200503558 | 1/2005 |
| TW | I230525 | 4/2005 |
| TW | I231666 | 4/2005 |
| WO | WO2004019447 | 3/2004 |
| WO | WO2004107693 | 12/2004 |
| WO | 2005053186 A1 | 6/2005 |
| WO | 2005109717 | 11/2005 |
| WO | WO2005107125 | 11/2005 |
| WO | WO2006028204 A1 | 3/2006 |
| WO | WO2006030867 | 3/2006 |
| WO | WO2006059566 | 6/2006 |
| WO | 2007024913 | 3/2007 |
| WO | 2008050996 | 5/2008 |
| WO | 2008058112 | 5/2008 |

OTHER PUBLICATIONS

Molisch, et al., MIMO systems with antenna selection, IEEE Microwave Magazine, XP002411128 URL:http://ieeexplore.ieee.org/iel5/6668/28677/01284943.pdf, Retrieved on Dec. 8, 2006, pp. 46-56 (2004).

Mui, "Successive interference cancellation for cdma2000 using a software defined radio," IEEE Wireless Communications and Networking Conference, 2006, vol. 3, pp. 1591-1596.

3GPP TSG RAN WG1 #42; "MIMO OFDMA Techniques for Downlink E-UTRA," 3GPP, R1-050724, Texas Instruments, pp. 1-6, London, UK, Aug. 29-Sep. 2, 2005.

3GPP TSG RAN WG1 #46; "Performance of per group rate control (PGRC) with advanced MIMO Receiver," 3GPP, R1-062015, pp. 1-6, Texas Instruments, Tallinn, Estonia, Aug. 28-Sep. 1, 2006.

3GPP TS 36.211 v0.0.0; "3rd Generation Partnership Project; Technical Specification Group Radio Access Network; Evolved UMTS Terrestrial Radio Access; Physical Channels and Modulation (Release x)," 3GPP Technical Specification, Sep. 2006.

3GPP2 C.S0084-001-0 v1.0; "3rd Generation Partnership Project 2; Physical Layer for Ultra Mobile Broadband (UMB) Air Interface Specification," 3GPP2 C.S0084-001-0 version 1.0, Apr. 5, 2007.

Written Opinion—PCT/US2007/076480, International Searching Authority—European Patent Office—Feb. 21, 2008.

Knopp R et al: "Power control schemes for TDD systems with multiple transmit and receive antennas" Global Telecommunications Conference—GLOBECOM '99, 1999, pp. 2326-2330, XP010373369 * the whole document *.

Kousa M A et al: "Multichannel Adaptive System" IEE Proceedings I. Solid-State & Electron Devices, Institution of Electrical Engineers. Stevenage, GB, vol. 140, No. 5, Part 1, Oct. 1, 1993, pp. 357-364, XP000403498 ISSN: 0956-3776 * the whole document.

Andreas et al., "MIMO systems with antenna selection," IEEE Microwave Magazine, URL:http//ieee/org/iel5/6668/28677/01284943/pdf, Retrieved on Dec. 8, 2006, pp. 36-56 (2004).

Translation of Office Action in Korean application 10-2009-7005874 corresponding to U.S. Appl. No. 11/508,386, citing KR1020040073551, KR1020050015731, KR1020030062135 and US20060023745 dated Mar. 24, 2011.

European Search Report—EP11005003—Search Authority—Hague—Sep. 9, 2011.

Taiwan Search Report—TW096131107—TIPO—Mar. 7, 2011.

Qualcomm Europe: "Description of Single and Multi Codeword Schemes with Precoding", 3GPP TSG-RAN WG1 #44, R1-060457, Feb. 13-17, 2006, pp. 9.

Qualcomm Europe: "MIMO proposal for MIMO-WCDMA evaluation", 3GPP TSG-RAN WG1#42, R1-050912, Aug. 29-Sep. 2, 2005, pp. 21.

* cited by examiner

| A | D | C | B | A | C | D | B | A | D | B | C | A | B | D | C | A | C | B | D | A | B | C | D |
|---|---|---|---|---|---|---|---|---|---|---|---|---|---|---|---|---|---|---|---|---|---|---|---|
| B | A | D | C | B | A | C | D | C | A | D | B | C | A | B | D | D | A | C | B | D | A | B | C |
| C | B | A | D | D | B | A | C | B | C | A | D | D | C | A | B | B | D | A | C | C | D | A | B |
| D | C | B | A | C | D | B | A | D | B | C | A | B | D | C | A | C | B | D | A | B | C | D | A |

SYSTEMS AND METHODS FOR REDUCING UPLINK RESOURCES TO PROVIDE CHANNEL PERFORMANCE FEEDBACK FOR ADJUSTMENT OF DOWNLINK MIMO CHANNEL DATA RATES

PRIORITY CLAIM

Claim of Priority under 35 U.S.C. §120

The present Application for Patent is a Continuation-in-Part and claims priority to patent application Ser. No. 11/078,470 entitled "Systems and Methods for Reducing Uplink Resources to Provide Channel Performance Feedback for Adjustment of Downlink MIMO Channel Data Rates" filed Mar. 11, 2005, and assigned to the assignee hereof and hereby expressly incorporated by reference herein.

BACKGROUND

1. Field

The invention relates generally to wireless communication systems, and more particularly to systems and methods for reducing the amount of feedback that is needed to select appropriate data rates for encoding data streams in order to maximize data throughput.

2. Background

Wireless communication systems may include multiple base stations and multiple mobile stations. At any given time, a particular base station may be in communication with one or more mobile stations. Communications from the base station to the mobile stations are often referred to as the forward link or down link, while communications from the mobile stations to the base station are referred to as the reverse link or uplink.

Data that is to be communicated between the base station and mobile station is typically encoded, transmitted by a transmitter (either in the base station or the mobile station,) received by a receiver (either in the mobile station or the base station,) and then decoded. The data is encoded at a data rate that is selected based upon the quality of the communication link. The better the link, the higher the data rate that can be used.

While the base station typically has the capacity to be able to increase the power at which data is transmitted and thereby increase the channel quality, this may not always be desirable. For instance, if the quality of the communication link is already sufficient to support an adequate data rate, increasing the power may simply increase the interference with other communications. Base stations therefore typically implement some sort of mechanism to control the power and data rates at which data is transmitted. This may, for example, involve measuring performance (e.g., signal-to-noise ratio, or SNR) at the mobile station, providing feedback on the performance to the base station, and changing the data rate at which the data is encoded and transmitted based on the measured performance.

One of the more recent advances in wireless communications has been the development of MIMO (multiple-input, multiple-output) systems. A MIMO system uses multiple transmit antennas and multiple receive antennas to establish multiple channels that can be spatially distinguished from each other. One of the problems that has been encountered in the development of communications using MIMO technology is the maximization of throughput for each of the MIMO channels and the amount of feedback that is necessary to maximize the throughput.

One approach (referred to as Per Antenna Rate Control, or PARC) requires that a separate SNR value be provided as feedback for each of the MIMO channels. This approach is not ideal because of the large amount of uplink resources that are required to provide SNRs for each of the channels. Another approach (referred to as Diagonal Bell Laboratories Layered Space Time Architecture, or D-BLAST) only requires a single SNR value as feedback, but requires the transmission of null signals before transmitting the sequence of encoded data blocks for a part of the MIMO channels. This results in an inefficient utilization of the channels. A third approach (referred to as Code Reuse Bell Laboratories Layered Space Time Architecture, or CR-BLAST) also requires only a single SNR value as feedback, but it uses a single common encoder to encode all the MIMO streams. As a result, it cannot take the advantage of successive interference cancellation (SIC) and individually optimized rate control. Unless it is incorporated with highly complex iterative demodulation and decoding, the performance of CR-BLAST becomes much poorer than the systems employing SIC and individually optimized rate control. It would therefore be desirable to provide systems and methods in which a reduced amount of feedback (e.g., less than separate SNRs for each of the channels) can be transmitted from the mobile station to the base station on the uplink, in which the utilization of the channels is not diminished by the transmission of null signals, and in which individual rate control and SIC can be applied.

SUMMARY

In one aspect of the invention, a method is disclosed which comprises receiving a plurality of permuted data streams over a plurality of channels and inversely permuting the data streams and determining a quality metric for each of the data streams and determining a condensed quality metric based on the quality metrics for each of the data streams. The method further comprises transmitting the condensed quality metric to a receiver.

In another aspect of the invention, an apparatus is disclosed which comprises means for receiving a plurality of permuted data streams over a plurality of channels, means for inversely permuting the data streams and means for determining a quality metric for each of the data streams and means for determining a condensed quality metric based on the quality metrics for each of the data streams. The apparatus further comprises means for transmitting the condensed quality metric to a receiver.

In another aspect of the invention, a mobile station for a wireless communication system is disclosed. The mobile station comprises a processing subsystem, a transceiver subsystem having a plurality of receive antennas and being coupled to the processing subsystem wherein the processing subsystem is configured to receive permuted data streams via the receive antennas, inversely permute the data streams, decode the data streams, determine an individual quality metric corresponding to each of the data streams, determine a condensed quality metric based on the individual quality metrics corresponding to each of the data streams. The mobile station is further configured to control the transceiver subsystem to transmit the condensed quality metric to a base station.

In another aspect of the invention, an apparatus is disclosed which comprises a receiver for receiving a plurality of data streams over a plurality of channels, a controller for determining an individual quality metric corresponding to each of the received data streams. The apparatus further comprises a transmitter for transmitting the individual quality metric corresponding to a first one of the received data streams and an auxiliary parameter corresponding to each remaining received data stream.

DETAILED DESCRIPTION

One or more embodiments of the invention are described below. It should be noted that these and any other embodiments described below are exemplary and are intended to be illustrative of the invention rather than limiting.

Embodiments of the invention which are disclosed herein address one or more of the needs indicated above by providing systems and methods for improving the performance of a MIMO OFDMA (Orthogonal Frequency Division Multiple Access) wireless communication system by reducing the amount of uplink resources that are needed to provide channel performance feedback for the adjustment of data rates on the downlink MIMO channels. In one embodiment, data streams are conventionally encoded, interleaved and mapped to modulation symbols in a base station. The modulation symbols are then mixed according to a pseudorandom pattern and transmitted by a set of transmit antennas so that the data of each data stream is transmitted over all of the MIMO channels. In one embodiment, a full permutation of the possible combinations is used. The data is received in a mobile station, unmixed (inversely permuted) and decoded. An SNR is determined for each data stream. In one embodiment, the data streams are decoded using successive interference cancellation. A condensed SNR metric (e.g., a reference SNR and ASNR) is then computed and transmitted back to the base station. The base station determines SNRs for each of the data streams based on the condensed SNR metric and uses these SNRs to adjust the data rates at which the respective data streams are encoded. In another embodiment the data streams are decoded without SIC. In this case, ASNR part of the condensed SNR is set to zero.

One embodiment comprises a method including encoding each of a set of data streams according to corresponding data rates, mixing the data streams on a set of MIMO channels according to a full permutation of combinations, transmitting the permuted data streams, receiving the permuted data streams, inversely permuting the data streams, decoding and determining an SNR for each of the data streams, computing a condensed SNR metric for the set of data streams, providing the condensed metric as feedback, determining a set of individual SNR metrics for the data streams based on the condensed SNR metric, and adjusting the data rates at which the data streams are encoded based on the individual SNR metrics.

Another embodiment comprises a MIMO wireless communication system. The system includes a base station having a plurality of MIMO transmit antennas and a mobile station having a plurality of MIMO receive antennas. The base station is configured to encode each of a plurality of data streams according to a corresponding data rate, permute the data streams and transmit each of the data streams over a plurality of MIMO channels corresponding to the MIMO transmit antennas. The mobile station is configured to inversely permute the data streams to reproduce the encoded data streams, decode the data streams and determine a quality metric corresponding to each of the data streams. The mobile station then determines a condensed quality metric based on the quality metrics corresponding to each of the data streams and transmits the condensed quality metric back to the base station. The base station is configured to determine an individual quality metric associated with each of the data streams based on the condensed quality metric, and then adjust the data rates at which each of the data streams is encoded based on the individual quality metrics.

Numerous alternative embodiments are also possible.

As described herein, various embodiments of the invention comprise systems and methods for improving the performance of a MIMO wireless communication system by reducing the amount of uplink (reverse link) resources that are needed to provide SNR/channel performance feedback for the adjustment of data rates on the downlink (forward link) MIMO channels.

In one embodiment, a set of data streams in a base station are encoded using corresponding data rates. The encoded data streams are then ready to be transmitted. Rather than transmitting each one of the encoded data streams over a single one of the MIMO channels, however, successive blocks in a frame of each encoded data stream are mixed and transmitted by the different ones of the MIMO channels. That is, the data streams are permuted across the different channels.

In this embodiment, a first block of each of the data streams is transmitted by a first combination of the MIMO channels. For example, if there are four data streams numbered 1-4 and four MIMO channels numbered 1-4, the first blocks of data streams 1-4 may be transmitted by MIMO channels 1-4, respectively. Then, the second blocks of data streams 1-4 might be transmitted by MIMO channels 2, 3, 4 and 1, respectively, and the third blocks might be transmitted by channels 3, 4, 1 and 2, respectively. In this embodiment, the successive blocks of data streams 1-4 are transmitted by each of the 24 possible permutations of MIMO channels 1-4.

The MIMO channels transmitted by the base station are spatially distinguishable by the MIMO receiver of a mobile station. The mobile station can therefore take the blocks of encoded data from each of the MIMO channels and reconstruct the encoded data streams (it is assumed that the mobile station knows the permutation scheme used by the base station to mix (permute) the blocks of the data streams across the MIMO channels.) The receiver then decodes the data streams and determines an SNR for each of the data streams.

Because the blocks of each data stream have been transmitted over all four MIMO channels, each of the four data streams will have experienced the same channel conditions, on the average if the channel remains nearly static during the transmission of the whole encoded frame. As a result, when the SNRs (averaged over a frame) are determined for each of the data streams, the SNR values should vary only because of the interference cancellation that may be achieved when each data stream is decoded and then used as feedback to remove the associated interference from the remaining data streams that will be subsequently decoded. This is known as successive interference cancellation.

Because the SNR of the four data streams vary only as a result of the successive interference cancellation, the SNR values will not vary wildly, but will instead be relatively well behaved. This is true even though the MIMO channel conditions may be vastly different (and could therefore cause the SNRs of data streams transmitted separately over corresponding single MIMO channels to vary to a much greater degree.)

The fact that the SNRs of the different data streams are relatively well-behaved allows the SNR values to be represented, with reasonable accuracy, in a condensed form (that is, a form which is more compact than separately providing each of the four different SNR values.) For example, the SNRs can be represented by a reference SNR value and a $\Delta$SNR value, where the reference SNR value corresponds to the SNR of the first decoded data stream, and the $\Delta$SNR value corresponds to the difference between the SNR values of successive data streams.

The mobile station transmits the condensed SNR representation to the base station via the uplink. Because the condensed SNR representation is smaller than the representation of four individual SNR values, less of the uplink resources are required to provide this feedback to the base station. The base station then uses the condensed representation of the SNRs for the different data streams as the basis for adjusting the data rates with which the different data streams are subsequently encoded. In other words, for one data stream, the base station will assume that the SNR measured by the mobile station was equal to the reference SNR value and will adjust to the data rate for this data stream as indicated by the reference SNR. For the next to data stream, the base station will assume a measured SNR value equal to the reference SNR value plus the $\Delta$SNR value. For the next data stream, a value equal to the reference SNR plus two times the $\Delta$SNR value will be used, and so on, with the data rate of each data stream being adjusted accordingly.

Figure 1:
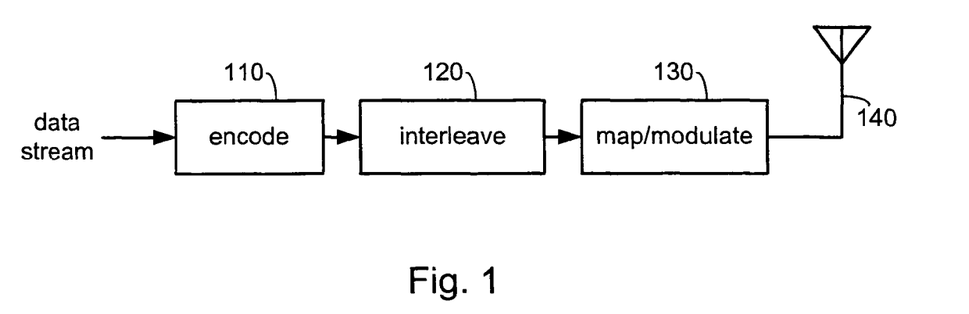
FIG. 1 is a functional block diagram illustrating the structure of an exemplary wireless transmitter.

Before discussing exemplary embodiments in detail, it will be useful to describe the basic operation of a single physical channel in a typical wireless communication system. Referring to FIG. 1, a functional block diagram illustrating the structure of an exemplary wireless transmitter is shown.

As depicted in FIG. 1, a data stream is received and processed by an encoder 110. The data stream is encoded at a selected data rate, as will be discussed further below. The encoded data stream is forwarded to an interleaver 120, and then to a mapper/modulator 130. The modulated signal is then forwarded to an antenna 140, which transmits the modulated signal.

Figure 2:
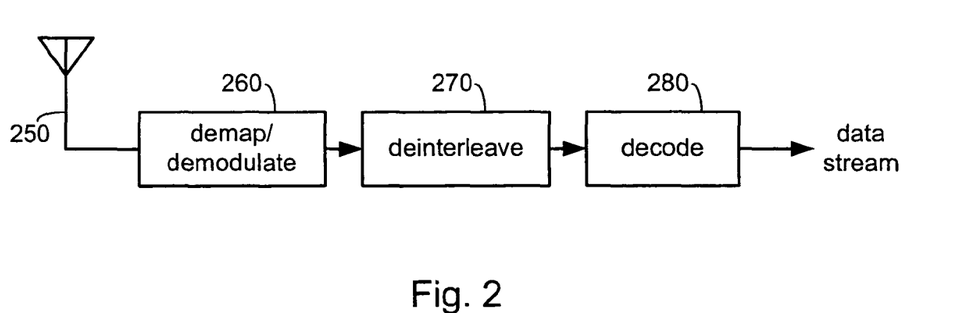
FIG. 2 is a functional block diagram illustrating the structure of an exemplary wireless receiver.

Referring to FIG. 2, a functional block diagram illustrating the structure of an exemplary wireless receiver is shown. In this figure, the signal transmitted by antenna 140 is received by antenna 250, and is then forwarded to demodulator/demapper 260. The signal is demodulated and passed to deinterleaver 270. After the signal is deinterleaved, it is decoded by decoder 280 to reproduce the original data stream. It should be noted that some errors may arise during the processing of the signal by the transmitter and receiver, so "original data stream," as used here, refers to the decoded signal, whether it is a completely accurate reproduction of the original signal, or contains some errors.

FIGS. 1 and 2 represent a mechanism for communicating information in a single direction. For example, the information may be communicated from a base station to a mobile station in a cellular telephone system. Typically, communications are bidirectional, rather than unidirectional, so a similar set of structures can be used to communicate information from the mobile station to the base station, as well as from the base station to the mobile station. In this type of system, the communications from the base station to the mobile station are typically referred to as the forward link, while the communications from the mobile station to the base station are referred to as the reverse link.

As noted above, the encoding of the data stream in the transmitter is based on a data rate that is selected for the transmission of the data. The data rate is, in turn, selected based upon the quality of the received signal. If the quality of the received signal is higher, a higher data rate can be decoded by the receiver. It is therefore desirable to increase the data rate so that higher throughput can be achieved. If the quality of the received signal is lower, only a lower data rate can be decoded by the receiver. In this case, it is desirable to decrease the data rate so that there are fewer errors in the decoded data.

In order to determine the data rate that should be selected to encode the data stream, it is first necessary to determine the quality of the received signal. In some systems, the quality of the signal is determined by measuring the signal-to-noise-ratio (SNR) of the signal. At certain SNR levels, corresponding data rates can be supported. For example, SNR1, can support up to data_rate1 with an acceptable error rate, SNR2 can support up to data_rate2, and so on. These systems therefore measure the SNR of the received signal and transmit this information back to the transmitter, which then determines whether the data rate currently being used to encode data for transmission is acceptable, too high, or too low. If the data rate is too high or too low, a more appropriate data rate can be selected for subsequent encoding.

It is a relatively straightforward matter in this single-channel scenario to provide the SNR of the received signal as feedback for use in adjusting the data rate at which the data is encoded. The SNR information is sufficient for the purposes of selecting a data rate, and this information does not constitute an especially large overhead cost. Even if the overhead cost is considered to be large, it would be difficult to reduce this burden, as the SNR is a single value and this information is necessary to determine the appropriate data rate.

Some systems, however, do not have only a single channel. For example, a MIMO (multiple input, multiple output) system has multiple physical channels. A MIMO transmitter has multiple antennas, each of which may be used to transmit a different one of the multiple MIMO channels. Similarly, a MIMO receiver has multiple antennas that are used to distinguish between the different physical channels transmitted by the antennas of the transmitter and to receive these separate physical channels.

In a typical MIMO system, each channel is processed in essentially the same manner as a single-channel system. In other words, for each channel, a data stream is encoded at a selected data rate, interleaved, mapped/modulated, transmitted via a corresponding one of the MIMO antennas, received at the receiver, demapped/demodulated, deinterleaved and decoded to a construct the original data stream. This process proceeds in parallel for each of the MIMO channels.

The MIMO system is configured so that the physical channels are independent of each other. Multiple data streams can therefore be separately transmitted over the different channels. In other words, each of the data streams can be transmitted by a different transmit antenna, and can be distinguished by the multiple-antenna MIMO receiver. This is illustrated in FIG. 3.

Figure 3:
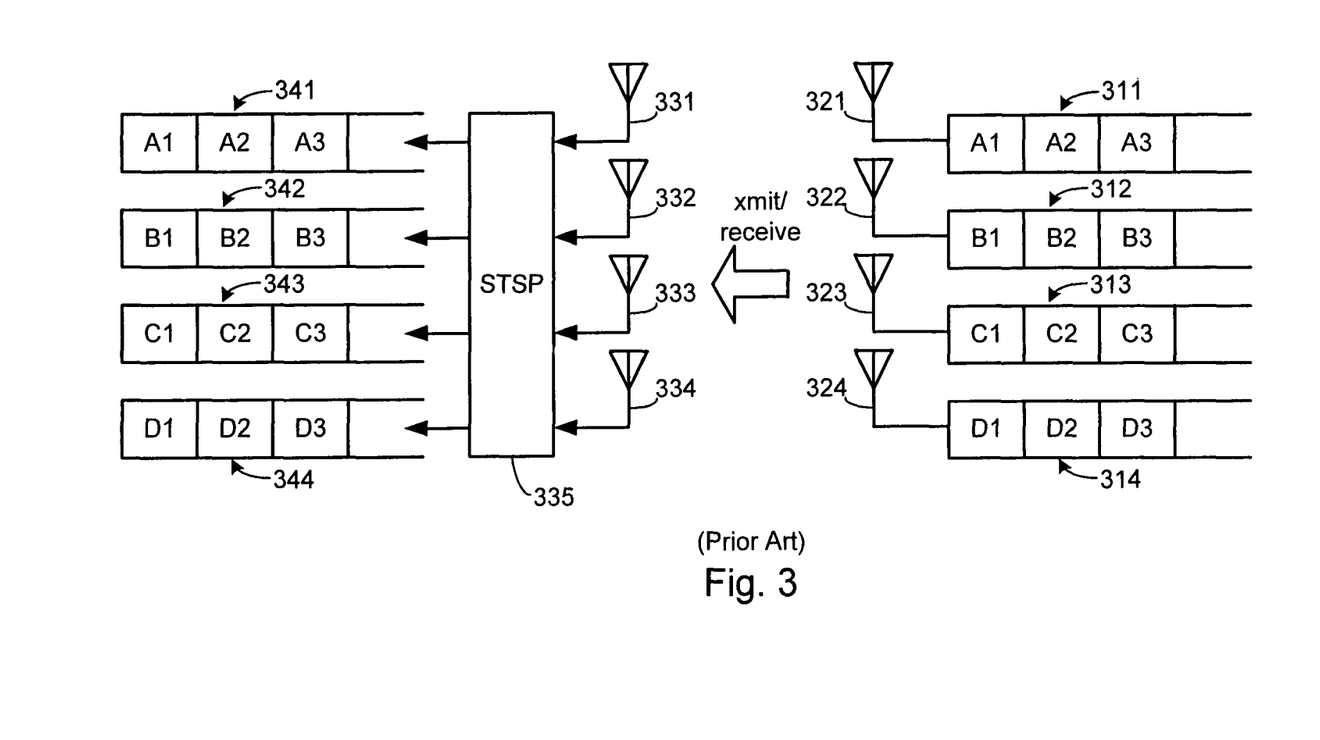
FIG. 3 is a diagram illustrating the transmission of each of a set of data streams over a corresponding set of MIMO channels in accordance with the prior art.

Referring to FIG. 3, a diagram illustrating the transmission of each of a set of data streams over a corresponding set of MIMO channels in accordance with a prior art system is shown. The system of FIG. 3 is representative of, for example, a PARC system. In this system, a set of encoded data streams 311-314 are transmitted by a set of transmit antennas 321-324. The transmitted signals are received by receive antennas 331-334. Space-time signal processor 335 processes the received signals (all of which are received by each of antennas 331-334) to distinguish data streams 341-344 (which are essentially the same as data streams 311-314.)

Because the MIMO channels are independent of each other, the different channels can have different fading characteristics. In other words each of the channels of the MIMO system could have a different SNR. As a result, the different channels may need to encode the respective data streams at different data rates in order to maximize the throughput of each of the channels.

The straightforward way to provide this SNR information would be to separately measure the SNRs for each of the MIMO channels, and then transmit each of these SNR values back to the transmitter, so that the data rates for each of the channels could be selected based upon the respective measured SNR values. This is the approach used in PARC systems. While this approach is straightforward, it requires a relatively large amount of reverse link resources. If there are n MIMO channels, this approach requires n times more resources than the single-channel case. Because of the high resource cost associated with this approach, the present systems and methods use an alternative approach that allows a condensed SNR metric to be returned to the transmitter as feedback and thereby conserves reverse link resources, while allowing the selection of data rates that more nearly maximize the throughput of the system.

Because the different MIMO channels are independent of each other, they have independent fading characteristics and channel quality. The SNRs of each of these channels are therefore also independent. Because the SNRs are independent, they may vary substantially from each other. For example, if there are four channels, the first channel may have an SNR of [+15] dB, the second channel may have an SNR of [−15] dB, the third channel may have an SNR of 0 dB, and the fourth channel may have an SNR of [+15] dB. It is clear that, in this situation, it would be very difficult to characterize the SNRs of all the channels in a condensed form. The present embodiments therefore employ a methodology which ensures that the SNRs will be sufficiently well-behaved to allow them to be represented with reasonable accuracy in a condensed form.

The methodology used in the present embodiments involves the transmission of data for each data stream over all of the MIMO channels. In other words, for each data stream, the data is processed within the transmitter in essentially the same manner as a typical MIMO system, but rather than transmitting the data via a single one of the MIMO antennas, one block is transmitted via a first antenna, the next block is transmitted via a second antenna, and so on. The blocks of each data stream are thereby spread across all of the MIMO channels (each MIMO channel being associated with a corresponding one of the MIMO antennas.) This is illustrated in FIGS. 4A and 4B.

Figure 4A:
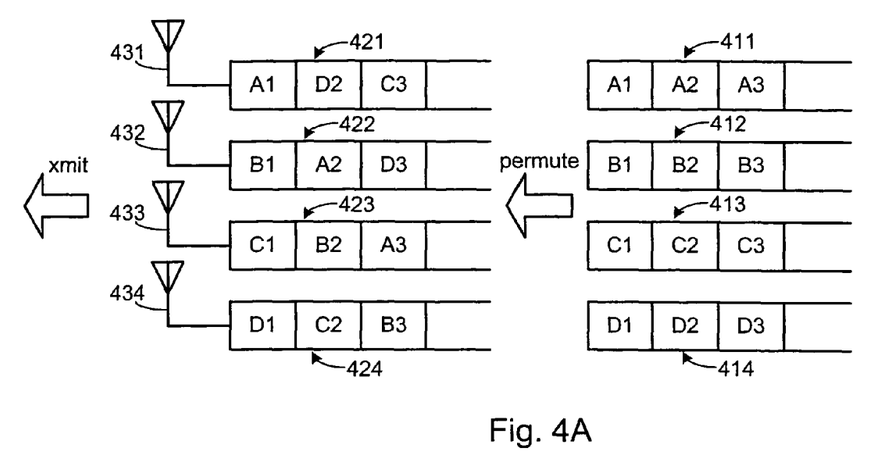
FIGS. 4A and 4B are a pair of diagrams illustrating the transmission of each of a set of data streams over every one of a set of MIMO channels in accordance with one embodiment.

Referring to FIG. 4A, a diagram illustrating the transmission of each of a set of data streams over every one of a set of MIMO channels in accordance with one embodiment is shown. On the right side of FIG. 4A, four data streams 411-414 are illustrated. Data streams 411-414 correspond to the encoded, interleaved, mapped/modulated data that has been processed by a transmitter and is ready to be transmitted over a wireless link to a receiver. In particular, the multiple data streams represent the data that would conventionally be transmitted over the separate channels of the MIMO system (the antennas of the MIMO transmitter.) Within each of the data streams, there are a series of data blocks. The data blocks are identified by a letter corresponding to the data stream and a number corresponding to the position of the data block within the data stream. The data blocks may be of any size that is convenient for a particular implementation, but they should not be so large that the benefit of permuting the data streams through the different channels is lost.

After the data streams have undergone the conventional pre-transmission processing, the blocks of each data stream are mapped to the different antennas of the MIMO transmitter. As shown in FIG. 4A, the first set of blocks, A1, B1, C1 and D1, are mapped to antennas 431, 432, 433 and 434, respectively. The next set of blocks, A2, B2, C2 and D2, are mapped to a different combination of the four antennas. Specifically, they are mapped to antennas 432, 433, 434 and 431, respectively. Put another way, the blocks of the different data streams have been rotated by one with respect to the antennas. The third set of data blocks is rotated by one again, so that data blocks A3, B3, C3 and D3 are mapped to antennas 433, 434, 431 and 432, respectively. Subsequent blocks are likewise mapped to different combinations of the antennas, to the extent possible. In one embodiment, the series of mappings of data blocks to MIMO channels comprises a pseudorandom pattern (as shown and described in connection with FIG. 5.)

Figure 4B:
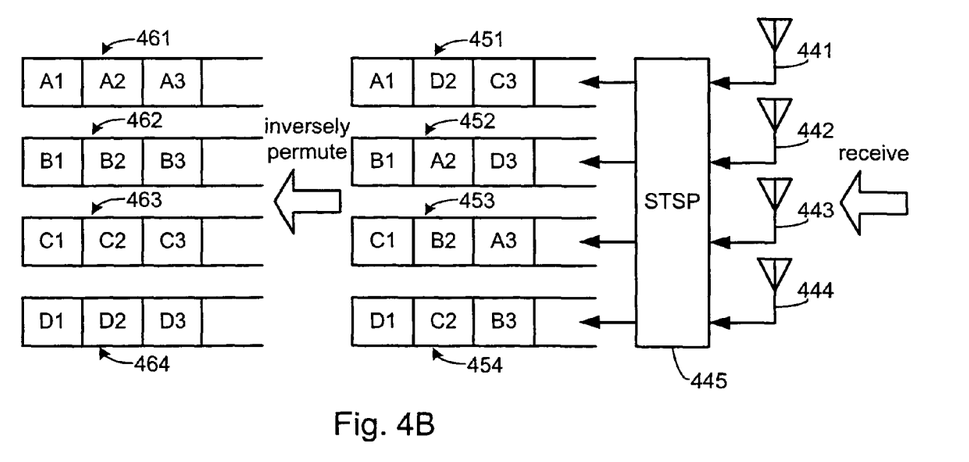

Referring to FIG. 4B, a diagram illustrating the receipt of each of the transmitted, mixed data streams at the receiver is shown. It can be seen that each of receiver antennas 441-444 receives the combined signals transmitted by transmitter antennas 431-434. Space-time signal processor 445 processes the received signals to distinguish permuted data streams 451-454. The receiver is aware of the algorithm and/or pattern for the mapping of original data streams 411-414 into mixed data streams 421-424. The receiver can therefore demap, or unmix, the received data blocks (451-454) to reconstruct the original data streams (461-464.) Reconstructed data streams 461-464 can then be demapped/demodulated, deinterleaved and decoded using conventional methods.

It can be seen from FIGS. 4A and 4B that the reconstructed data streams consist of data blocks that have been transmitted over all of the MIMO channels, preferably in a pseudorandom pattern. For example, reconstructed data stream 411 includes data blocks A1, A2, A3. These data blocks were transmitted over the first, second, third, etc. MIMO channels. The other reconstructed data streams were likewise transmitted over all of the MIMO channels. By transmitting each data stream over all of the MIMO channels, each data stream experiences, on average, the same channel conditions. In other words, each of the data streams has approximately one fourth of its data blocks transmitted over each of the MIMO channels and therefore experiences the channel conditions of each of the MIMO channels for one quarter of the time.

Considering the example above in which the SNRs of the different channels varied from [+15] dB to [−15] dB, transmitting each data stream over all four of these channels would result in an average SNR of somewhere between [+15] dB and [−15] dB. For example, the SNR might be [+5] dB. While the SNRs of the different data streams most likely will not be exactly the same, they should be roughly equivalent, and certainly will be very well behaved in comparison to the SNR variations in a typical MIMO system.

It should be noted that, in addition to providing the benefit of equalizing the SNRs associated with the different data streams, transmitting each of the data streams over all of the MIMO physical channels may have additional benefits. For example, there is a benefit to using different signal paths for the transmission of a data stream, in that the diversity provides a more robust channel.

If each of the data streams is going to be transmitted over multiple physical channels, it is necessary to determine how the different data streams will be mixed on the channels. In other words, it is necessary to determine which data stream will be transmitted by which antenna at any particular time. In some embodiments, it may be possible to simply rotate the data streams through the different antennas. For example, if there are four channels, successive blocks of a data stream may be transmitted by antennas 1, 2, 3, 4, 1, 2, 3, 4, and so on.

While there may be benefits to using a simple rotation such as this, it is contemplated that better performance, in terms of both equalization of the SNRs associated with the data streams and the diversity benefits, will likely be achieved if a pseudorandom pattern including a full permutation of the possible combinations of data streams and physical channels is used. A "full" permutation of combinations, as used herein, refers to all possible orders of combinations of the data streams and physical channels. An example is shown in FIG. 5.

Figure 5:
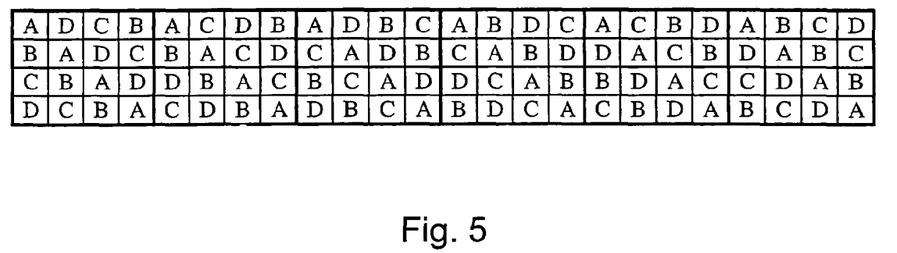
FIG. 5 is a table illustrating all of the possible permutations of four data streams transmitted over four MIMO channels.

Referring to FIG. 5, a table illustrating all of the possible permutations of four data streams transmitted over four MIMO channels is shown. The data blocks corresponding to a particular data stream are identified by the same letter. For example, all of the data blocks from a first one of the data streams are identified by the letter "A." The data blocks of the second, third and fourth data streams are identified by the letters "B," "C" and "D," respectively. Each row of the table corresponds to a particular MIMO channel. Each column of the table corresponds to a successive data blocks that is transmitted on the MIMO channel.

It can be seen that, at each point in time (i.e., in each column of the table,) one data block is transmitted from each of the four data streams. In the first (far left) column, data blocks from data streams A, B, C and D are transmitted on MIMO channels 1, 2, 3 and 4, respectively. In the next column, the data streams (or MIMO channels) are rotated, so that data blocks from data streams A, B, C and D are transmitted on MIMO channels 2, 3, 4 and 1, respectively. The data streams are rotated to more times with the data blocks in this order.

In the fifth column, the data streams in the original order would be rotated back to the original combination of data streams and MIMO channels (i.e., data streams A, B, C and D on MIMO channels 1, 2, 3 and 4, respectively.) Rather than repeating this combination, the data streams are permuted so that data streams A, B, C and D are transmitted on MIMO channels 1, 2, 4 and 3, respectively. The data streams are then rotated in this order until a block from each data stream has again been transmitted on each of the MIMO channels.

This process is repeated for each permutation of the combinations of data streams and MIMO channels. The four data streams can be ordered in six different permutations: A-B-C-D; A-B-D-C; A-C-B-D; A-C-D-B; A-D-B-C; and A-D-C-B. Each of these orderings of the data streams can then be rotated through four different MIMO channels. For example, A-B-C-D can be transmitted on channels 1-2-3-4, 4-1-2-3, 3-4-1-2, or 2-3-4-1. Consequently, there are 24 (4 factorial, or 4!) different combinations of the four data streams and the four MIMO channels. The transmission of the data streams over the MIMO channels using all of these different combinations is referred to file the purposes of disclosure as a full permutation of the combinations.

It should be noted that the system described here is intended to be illustrative, and that alternative embodiments may have different numbers of data streams and/or MIMO channels. For embodiments in which the number of data streams is equal to the number of MIMO channels, the number of different combinations of the data streams and MIMO channels is given by n! (n factorial,) where n is the number of data streams/MIMO channels. Thus, for example, a system having three data streams and three MIMO channels would have 3!, or 6, different combinations in a full permutation. A system having five data streams and five MIMO channels would have 5!, or 120, different combinations in a full permutation.

Because the blocks of each of the data streams have been transmitted over all of the MIMO channels and experience essentially the same channel conditions, the SNRs of the different data streams are well behaved. Ideally, the SNRs of the data streams are equivalent. It may therefore be possible to provide feedback to the transmitter in the form of a single SNR that represents all of the data streams. This may not provide the highest throughput for the data streams, however.

In one embodiment, the MIMO receiver is a linear receiver without nonlinear interference cancellation.

If there is no successive interference cancellation operation at the receiver, the highest data rate can be achieved with only a single SNR feedback by applying the pseudorandom antenna permutation described above. When the received vector of the N×N MIMO system at the symbol time k is denoted by y(k) such that $$y_{N\times 1}(k) = H_{N\times N}(k)x_{N\times 1}(k) + n_{N\times 1}(k) \qquad (1)$$
$$= x^{(1)}(k)h^{(1)}_{N\times 1}(k) + x^{(2)}(k)h^{(2)}_{N\times 1}(k) + \ldots +$$
$$x^{(N)}(k)h^{(N)}_{N\times 1}(k) + n_{N\times 1}(k),$$

the SNR of the i-th stream in the linear minimum mean squared error (MMSE) receiver becomes $$SNR^{(i)}(k) = \frac{P}{N} h^{(i)H}_{1\times N}(k)[N^{(i)}_{N\times N}(k)]^{-1} h^{(i)}_{N\times 1}(k), \qquad (2)$$

where the i-th noise covariance matrix is represented by $$N^{(i)}_{N\times N}(k) = \sigma^2 I_{N\times N} + \sum_{\substack{j=1 \\ j\neq i}}^{N} \frac{P}{N} h^{(j)}_{N\times 1}(k) h^{(j)H}_{1\times N}(k). \qquad (3)$$

In (1)-(3), $H_{N\times N}(k)=[h_{N\times 1}^{(1)}(k), h_{N\times 1}^{(2)}(k), h_{N\times 1}^{(N)}(k)]^T$ denotes the channel matrix, $x_{N\times 1}(k)=[x^{(1)}(k),x^{(2)}(k), \ldots, x^{(N)}(k)]^T$ denotes the normalized signal vector, and $n_{N\times 1}(k)$ denotes the background noise vector received by the N receive antennas whose variance is $\sigma^2$ per dimension. Though the MIMO system considered here has N data streams, N transmit antennas, and N receive antennas, the number of MIMO transmit streams needs not be equal to the number of transmit antennas nor to the number of receive antennas. The number of transmit antennas and that of the receive antennas need not be the same, either.

In general, different streams will see different SNR values as there are different receive channel vectors for different transmit antennas. When the number of symbols in the encoding block and the system bandwidth are denoted by K and W, the achievable data rate (bits per second) for the i-th stream of the PARC system can be calculated in a quasi-static channel by using the mapping (or by any other properly designed SNR-rate mapping formula) of $$R^{(i)} = \frac{W}{K} \sum_{k=1}^{K} \log(1 + SNR^{(i)}) = W\log(1 + SNR^{(i)}). \quad i = 1, 2, \ldots, N. \quad (4)$$

It should be noted that the time index k has been deliberately omitted in representing the SNR, as a quasi-static channel is assumed. These N requested data rates are fed back and used to encode the next N-stream data frame. The total data rate that can be achieved by the independent stream-wise encoding is given by $$R = \sum_{i=1}^{N} R^{(i)} = W \sum_{i=1}^{N} \log(1 + SNR^{(i)}). \quad (5)$$

Now if pseudorandom antenna permutation is applied as in FIGS. 3-4, it can be seen that the rates of the N streams have the same value. More specifically, when the permuted antenna index of the i-th stream at time k is denoted by π(i, k), the achievable data rate of the i-th stream is $$R^{(i)} = \frac{W}{K} \sum_{k=1}^{K} \log(1 + SNR^{\pi(i,k)}(k)) = \frac{W}{K} \sum_{k=1}^{K/N} \sum_{j=1}^{N} \log(1 + SNR^{(j)}) = \quad (6)$$

$$\frac{W}{N} \sum_{j=1}^{N} \log(1 + SNR^{(j)}), \quad i = 1, 2, \ldots, N,$$

and all $R^{(i)}$'s have the same value. The total achievable data rate is still given by (5) if the encoded frame size is large and a random-like coding such as turbo coding is used. The relations between PARC and pseudorandom antenna permutation are similar, even when a linear zero-forcing (ZF) or matched-filter (MF) receiver, rather than an MMSE receiver, is assumed. It should be noted that only antenna cycling operations and a single SNR feedback are needed to achieve the maximum data rate in the linear receiver case instead of taking all the permutations.

In one embodiment, the MIMO receiver employs a successive interference cancellation (SIC) methodology in decoding the data streams. The SIC receiver achieves improved SNR values for some of the data streams by first decoding one of the data streams, then using this information to cancel some of the interference in the remaining data streams. More specifically, the first-decoded data stream is used to regenerate the interference that it created during transmission. This interference can then be canceled out of the received superposition of data streams. A second one of the data streams would then be decoded. Because the interference in this data stream is reduced as a result of the interference cancellation from the first data stream, the SNR of the second-decoded data stream is greater than the SNR of the first-decoded data stream. The second-decoded data stream is then used in the same manner as the first data stream to cancel some of the interference in the remaining data streams. This process is repeated for each of the remaining data streams.

When this SIC methodology is used, the SNR associated with a particular data stream corresponds to the order in which the data stream was decoded, with the first data stream to be decoded having the lowest SNR, and the last data stream to be decoded having the highest SNR. Because the SNRs of the different data streams are not the same, the data streams can support (i.e., be encoded at) different data rates. The data stream having the lowest SNR supports the lowest data rate, while the data stream having the highest SNR supports the highest data rate. If a single SNR value is provided by the receiver as feedback and is used by the transmitter as the basis for selecting a data rate to encode each data stream, the maximum possible throughput on the data streams having the higher SNRs will not be achieved. It is therefore useful in this embodiment to provide some indication of the difference between the SNRs of the different data streams so that appropriate data rates can be selected for each of the data streams.

When an MMSE-SIC or ZF-SIC decoder is used at the receiver, the maximum data rate cannot be achieved in a strict sense unless N SNR values are provided as feedback. Most of the maximum data rate, however, can be achieved in a practical sense with the condensed SNR (or, reduced feedback) by applying a proper approximation formula, as described herein.

On the other hand, when an MF-SIC decoder incorporated with the pseudorandom antenna permutation is used, the SNR values of the other data streams may be more accurately calculated at the transmitter by using the SNR of the first data stream and an average channel correlation factor among the streams. The instantaneous SNR of the first stream at the output of the MF (or pilot-weighted combiner) is represented by $$SNR^{(1)}(k) = \frac{\|h_{N\times 1}^{\pi(1,k)}\|^4 P/N}{\sum_{i=2}^{N} |h_{1\times N}^{\pi(1,k)H} \cdot h_{N\times 1}^{\pi(i,k)}|^2 P/N + \|h_{N\times 1}^{\pi(1,k)}\|^2 \sigma^2} \quad (7)$$

where P, N, and $\sigma^2$ respectively denote signal energy, number of data streams, and the variance of the background noise. A simple way (though it is not optimal in terms of achievable data rate) to calculate the average SNR of an encoding frame is to take the ratio of the average signal power (or more specifically, the arithmetic mean) to the average (arithmetic mean) interference and noise power such that $$SNR_{frame,avg}^{(1)} \equiv \frac{\frac{1}{K}\sum_{k=1}^{K} \|h_{N\times 1}^{\pi(1,k)}\|^4 P/N}{\frac{1}{K}\sum_{k=1}^{K}\left\{\sum_{i=2}^{N} |h_{1\times N}^{\pi(1,k)H} \cdot h_{N\times 1}^{\pi(i,k)}|^2 P/N + \|h_{N\times 1}^{\pi(1,k)}\|^2 \sigma^2\right\}} \quad (8)$$

-continued $$= \frac{\frac{1}{N}\sum_{j=1}^{N}\|h_{N\times 1}^{(j)}\|^4 P/N}{(N-1)\frac{2}{N(N-1)}\sum_{i=1}^{N}\sum_{j=i+1}^{N}|h_{1\times N}^{(i)H}\cdot h_{N\times 1}^{(j)}|^2 P/N + \frac{1}{N}\sum_{j=1}^{N}\|h_{N\times 1}^{(j)}\|^2\sigma^2}$$

$$\equiv \frac{\frac{P}{N\sigma^2}\cdot\frac{\sum_{j=1}^{N}\|h_{N\times 1}^{(j)}\|^4}{\sum_{j=1}^{N}\|h_{N\times 1}^{(j)}\|^2}}{(N-1)\cdot\rho_{avg}\cdot\frac{P}{N\sigma^2}\cdot\frac{\sum_{j=1}^{N}\|h_{N\times 1}^{(j)}\|^4}{\sum_{j=1}^{N}\|h_{N\times 1}^{(j)}\|^2}+1},$$

where the average channel correlation factor is calculated by $$\rho_{avg} \equiv \frac{\frac{2}{N(N-1)}\sum_{i=1}^{N}\sum_{j=i+1}^{N}|h_{1\times N}^{(i)H}\cdot h_{N\times 1}^{(j)}|^2}{\frac{1}{N}\sum_{j=1}^{N}\|h_{N\times 1}^{(j)}\|^4} \xrightarrow{N-large} \frac{1}{N}. \quad (9)$$

In the same way, the average SNR of an encoding frame of the i-th stream, which is decoded after cancellation of the first i-1 streams, can be calculated. Due to the symmetric structure of the Pseudorandom Antenna Permutation, a similar SNR result to that of the $1^{st}$ stream is achieved with a discrepancy of the effective number of interference signals, which is represented by $$SNR_{frame,avg}^{(i)} = \frac{\frac{P}{N\sigma^2}\cdot\frac{\sum_{j=1}^{N}\|h_{N\times 1}^{(j)}\|^4}{\sum_{j=1}^{N}\|h_{N\times 1}^{(j)}\|^2}}{(N-i)\cdot\rho_{avg}\cdot\frac{P}{N\sigma^2}\cdot\frac{\sum_{j=1}^{N}\|h_{N\times 1}^{(j)}\|^4}{\sum_{j=1}^{N}\|h_{N\times 1}^{(j)}\|^2}+1}. \quad (10)$$

From (8) and (10), a relation of the SNR between the $1^{st}$ stream and the i-th stream can be derived so that it is $$SNR_{frame,avg}^{(i)} = \frac{SNR_{frame,avg}^{(1)}}{1-(i-1)\cdot\rho_{avg}\cdot SNR_{frame,avg}^{(1)}}, \quad (11)$$

or, equivalently, the SNR relation can be rewritten to be $$SNR_{frame,avg}^{(i)} = \frac{SNR_{frame,avg}^{(N)}}{1+(N-i)\cdot\rho_{avg}\cdot SNR_{frame,avg}^{(N)}}, \quad (12)$$

through the SNR of the last stream. Therefore, if the SNR of the $1^{st}$ decoded stream (or the last or any other decoded stream) and the average channel correlation factor is available, the SNR values of the other streams of the Pseudorandom Antenna Permutation system incorporated with the MF-SIC receiver can be accurately predicted. Formulae (11)-(12), however, present only one example of how the full set of SNR values of all the data streams can be restored when only one SNR value and one correlation parameter are available. It should be noted that the more sophisticated effective SNR based on (6) should be provided as feedback rather than the arithmetic-mean-based average SNR in (10) to make a more pertinent and optimized rate selection. Thus, in the actual implementation, any other formulae which effectively account for the SNR relations of the streams in a given MIMO system, can be used with the reference SNR and one or a series of auxiliary parameters. The auxiliary parameter may be the average channel correlation factor, $\Delta$SNR, or any others.

The SNR prediction formula in (11) or (12), which is an accurate calculator of the SNR values in the MF-SIC receiver case, can be used as an SNR lower bound of an MMSE-SIC receiver. In fact, the SNR of the last decoded stream will be the same between the MF-SIC and MMSE-SIC if the background noise is white, and the SNR gap (i.e, MMSE SNR− MF SNR) between the other streams will highly depend on the average channel correlation factor. When the average channel correlation factor is small (or, most spatial signatures are nearly orthogonal one another), the gap will be nearly zero even for the other streams (and the SNR values across different streams will almost be the same); otherwise it may become large. Assuming that the MS returns the SNR of the last decoded stream and the average channel correlation factor of (9), the base station can choose the rates conservatively on the basis of (12) so that the latter streams can be almost surely decoded once the first stream is decoded. On the other hand, the base station can discount the reported average channel correlation factor to a smaller value in consideration of the capability of the advanced receiver (i.e., MMSE-SIC): The reported average channel correlation factor in (9) may be diminished more aggressively if it is large, while it is kept almost intact if it is small.

As an alternative, the mobile station can actually generate all the average SNR values of the N streams in the decoding stage and estimate the optimal effective average channel correlation factor so that the curve in (12) (or another properly designed curve for the MMSE-SIC or ZF-SIC) is as close as possible to the generated SNR values. Then the SNR of the last stream and the effective average channel correlation factor are fed back so that the base station can choose the rates according to (12).

In practice, it may be possible to derive an approximate SNR relation better than (12) in the MMSE-SIC or ZF-SIC receiver case in terms of simplicity, effective description of SNR relations, etc. For example, it may be possible to take an additive SNR relation $$SNR^{(i-1)}_{frame,avg} = SNR^{(i)}_{frame,avg} - f^{(i)}(SNR^{(N)}_{frame,avg}, \rho) \quad (13)$$

or a multiplicative SNR relation $$SNR^{(i-1)}_{frame,avg} = SNR^{(i)}_{frame,avg} / f^{(i)}(SNR^{(N)}_{frame,avg}, \rho) \quad (14)$$

for a properly selected auxiliary parameter $\rho$ and a recursion function $f^{(i)}(\cdot,\cdot)$. The recursion function may take a constant value, for example, $f^{(i)}(SNR_{frame,avg}^{(N)}, \rho)=K$, for a simple implementation.

In one embodiment, the feedback provided by the receiver consists of a reference SNR value and a ΔSNR value. Because the channel quality experienced by each of the data streams is essentially the same, the difference in SNRs for each of the data streams results from the cancellation of interference when decoding successive ones of the data streams. Because the effect of SIC on the SNR of successive data streams is well behaved and well understood, the SNRs of the data streams can be reasonably approximated by a reference SNR value and a ΔSNR value, where the reference SNR value is the actual SNR for the first-decoded channel (or the last-decoded or any other pre-specified channel depending on the system design,) and the ΔSNR value is the improvement (or degradation depending on the system design) in the SNR for each successively-decoded channel. For example, the SNR of the first-decoded channel is equal to the reference SNR, the SNR of the second-decoded channel is equal to the reference SNR plus ΔSNR, the SNR of the third-decoded channel is equal to the reference SNR plus two times ΔSNR, and so on. It should be noted that the base station is assumed to know the order in which the mobile station decodes the data streams and is therefore able to apply the SNRs (reference SNR plus multiple of ΔSNR) to the appropriate data streams. The calculation and the plus operation of ΔSNR can be made either in the linear scale or in the deciBell (dB) scale. As the plus operation in the dB scale corresponds to the multiplication operation in the linear scale, the linear and the dB scaled plus operations are respectively equivalent to using (13) and (14) with $f^{(i)}$ $(SNR_{frame,avg}^{(N)}, \rho)$=ΔSNR(linear-scaled-value).

In an alternative embodiment, the feedback provided by the receiver may include a reference SNR (i.e., a full SNR value) for one data stream or layer and the incremental SNR values for the other layers. For example, the feedback provided by the receiver may include the full SNR value for one layer (e.g., referring to FIG. 6, "SNR1," the SNR of the first layer) and also include the incremental SNR values (SNR2(dB)–SNR1(dB)), (SNR3(dB)–SNR2(dB)), and (SNR4(dB)–SNR3(dB)) for each of the remaining three layers (i.e., the second through fourth layers). Accordingly, the transmitter will be able to determine the actual SNR values for each of the layers by a full SNR value of one layer and the incremental SNR values of the remaining layers provided by the receiver. Thus, in the example provided above, the transmitter can derive the full SNR values of the remaining layers by adding the respective incremental SNR values to SNR1. It will be appreciated, however, that the bitwidth to represent the SNR gaps (i.e., the incremental SNR values) is much smaller than that of the original, full SNR values due to permutation effects. It will also be appreciated that the data streams or layers need not necessarily be limited to the four as provided in the aforementioned example.

Figure 6:
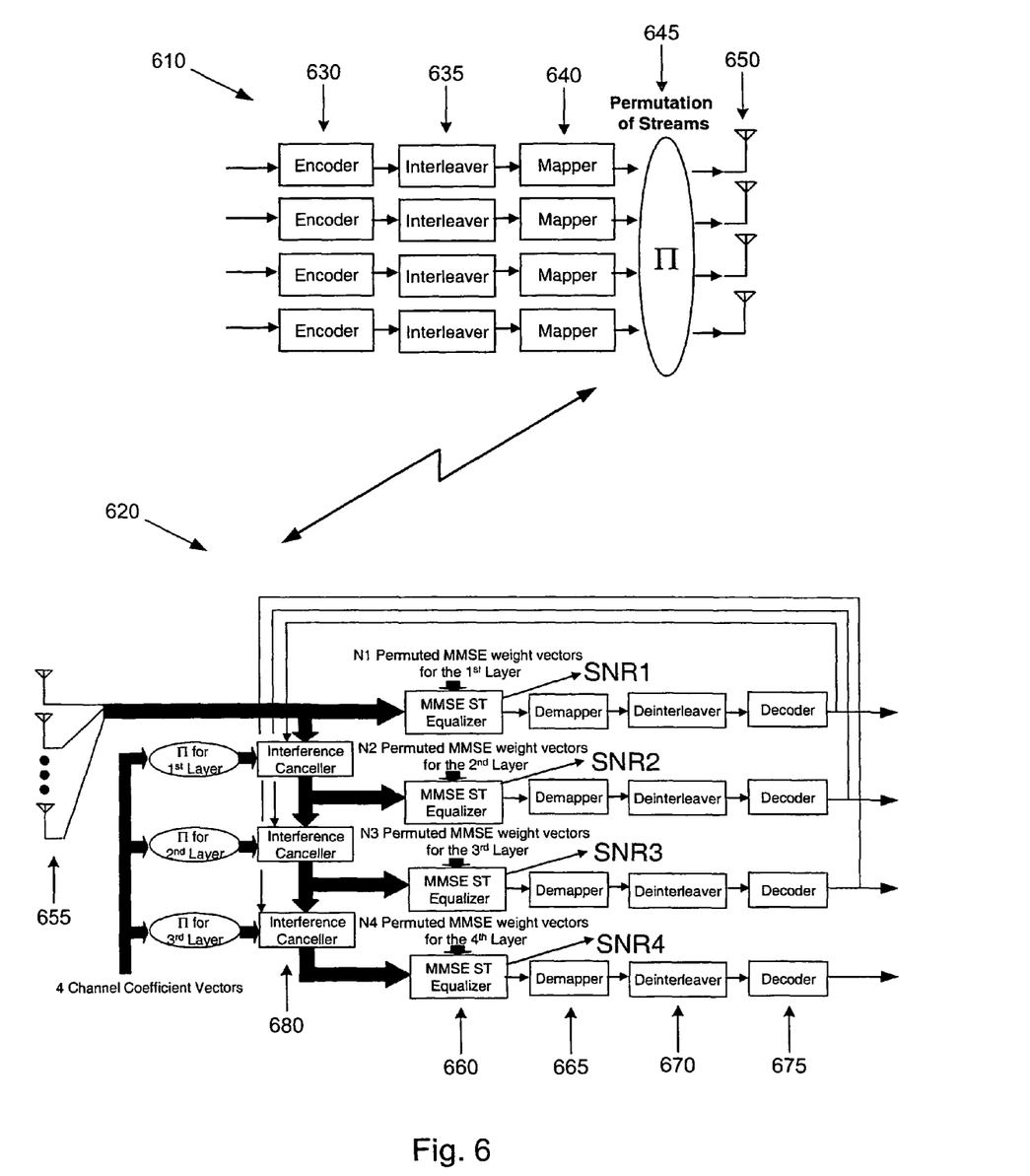
FIG. 6 is a functional block diagram illustrating the structure of a system that utilizes pseudorandom antenna permutation and successive interference cancellation in accordance with one embodiment.

Referring to FIG. 6, a functional block diagram illustrating the structure of a system that utilizes pseudorandom antenna permutation and successive interference cancellation in accordance with one embodiment is shown. In this embodiment, the system consists of a transmitter 610 and a receiver 620. In one embodiment, transmitter 610 is implemented in a wireless base station and receiver 620 is implemented in a wireless mobile station to form a communication downlink. The mobile station also includes a transmitter and the base station includes a receiver to form a corresponding communication uplink.

Transmitter 610 and receiver 620 are MIMO devices that are configured to transmit and receive four channels. Transmitter 610 is configured to process four data streams and transmit corresponding encoded data streams over pseudorandom combinations of the four physical MIMO channels. Receiver 620 is configured to receive the data on the four MIMO channels, reconstruct the encoded data streams and process this data to regenerate the original data streams.

Referring to transmitter 610, the four original data streams are received by encoders 630. Each of the encoders encodes the corresponding data stream at a data rate which is selected for that particular data stream. The encoded data symbols are then interleaved by interleavers 635 and mapped to modulation symbols by mappers 640. The modulation symbols are then mapped by permutation unit 645 to antennas 650. The modulation symbols are then transmitted by antennas 650 according to the permutation scheme implemented by permutation unit 645.

Referring to receiver 620, the transmitted symbols are received by antennas 655 and are forwarded to a first one of equalizers 660. This first equalizer computes the SNR for a first one of the data streams and forwards the signal to a first one of demappers 665. The encoded symbols are then deinterleaved by first one of deinterleavers 670 and decoded by first one of decoders 675. The decoded data is provided to a first one of interference cancelers 680, which regenerates the interference corresponding to the first data stream and cancels this interference from the received signal. A similar processing path is provided for signals corresponding to each of the remaining data streams.

After all four of the data streams have been decoded, SNRs have been determined for each of the data streams. As described above, the SNRs of the data streams are equalized by transmitting them over all of the MIMO channels, so differences in the SNRs determined for each of the data streams arise from the successive interference cancellations. The receiver can therefore compute a condensed SNR metric for the well-behaved set of SNRs corresponding to the four data streams. In one embodiment, this condensed metric consists of a reference SNR value and a ΔSNR value, where the ΔSNR value is the difference between SNRs of successive ones of the data streams in either linear scale or dB scale. This condensed metric is then provided as feedback to the transmitter, which can adjust the data rates at which the different data streams are encoded based on the corresponding SNRs, as determined from the condensed SNR metric.

Figure 7:
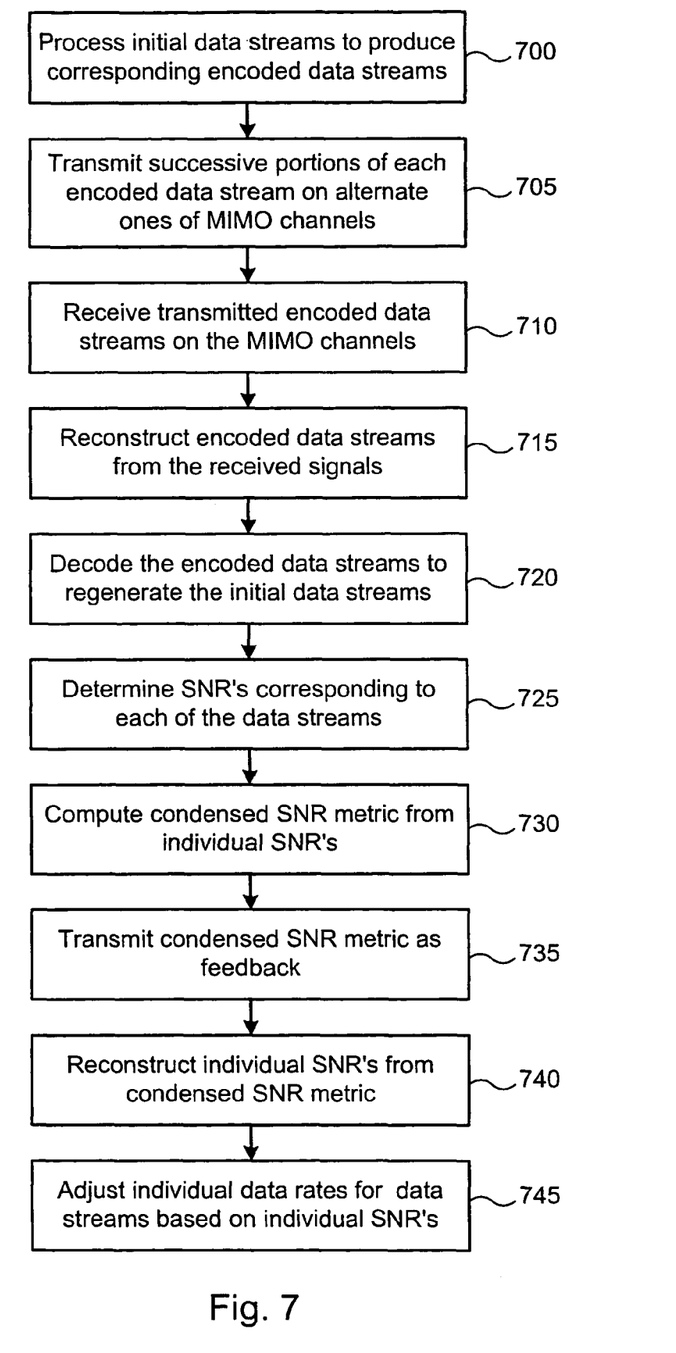
FIG. 7 is a flow diagram illustrating the processing and transmission of multiple data streams in a MIMO communication system, as well as the determination of a condensed metric to be provided as feedback for control of the data rates in the processing of the data streams in accordance with one embodiment.

The operation of this system can be summarized as shown in FIG. 7. FIG. 7 is a flow diagram illustrating the processing and transmission of multiple data streams in a MIMO communication system, as well as the determination of a condensed metric to be provided as feedback for control of the data rates in the processing of the data streams in accordance with one embodiment.

As shown in FIG. 7, a set of n initial data streams is first process to produce a corresponding set of encoded data streams (700). This processing corresponds to the encoding, interleaving and mapping/modulating of a whole data frame performed by components 630, 635 and 640 of transmitter 610. Successive portions (e.g., blocks) in a frame of each of the encoded data streams are then transmitted on alternate ones of a plurality of MIMO channels (705). As noted above, the transmission on alternate ones of the MIMO channels can, for example, follow a pseudorandom pattern. In one embodiment, the pseudorandom pattern includes all of the possible permutations of the combinations of data streams and MIMO channels. The mixing and transmission of the encoded data streams corresponds to components 645 and 650 of transmitter 610.

The transmitted data is then received by the receiver (710). The receiver is a MIMO receiver that can spatially distinguish the different MIMO channels. The mixed portions of the data streams are unmixed and the encoded data streams are reconstructed (715). After the encoded data streams are reconstructed, an SNR is determined for each of the encoded data streams, and the encoded data streams are decoded to the initial data streams (720, 725). As described above, in the embodiment of FIG. 6, the data streams are decoded sequentially and are used to regenerate and then cancel the interference corresponding to the decoded data streams.

When the SNRs for each of the data streams have been determined, a condensed SNR metric is computed from these values (730). As discussed above, the condensed metric in one embodiment comprises a reference SNR value and a $\Delta$SNR value. The condensed SNR metric is then sent back to the transmitter (735). As previously noted, transmitter 610 and receiver 620 form the downlink of a wireless communication system which also includes an uplink transmitter and receiver (not shown in FIG. 6) which are used to transmit the condensed SNR metric as feedback. When the condensed SNR metric is received, the SNRs for each of the data streams are reconstructed (740), and the data rates at which each of the data streams are encoded are adjusted based upon these SNR values (745). If the receiver does not use successive interference cancellation, the $\Delta$SNR is set to 0 in the linear scale case and 0 dB in the dB scale case.

In one embodiment, the receiver may additionally feed back the information that requests turning off some of the transmit antennas. Then, the presented pseudorandom antenna permutation and condensed SNR feedback will be applied only to the active transmit antennas which are actually transmitting data streams.

In another embodiment, the number of active data streams ($N_s$) may be smaller than the number of transmit antennas ($N_t$). Then, $N_t$–$N_s$ transmit antennas might not transmit any signal at a given time. Even in this case, the pseudorandom antenna permutation and the condensed SNR feedback can be applied by considering that there are $N_t$–$N_s$ more data streams, all of which have zero transmit power.

As noted above, the foregoing embodiments are illustrative of the invention, rather than limiting. Alternative embodiments may have numerous variations from the systems and methods described above. For example, alternative embodiments may use a condensed feedback metric that comprises a value other than a reference SNR value and a $\Delta$SNR value. In fact, the metric may comprise values other than SNRs, such as error rates in the received, decoded data streams. Alternative embodiments may also have different types of receivers (e.g., non-SIC), different numbers of channels, and other variations.

Although not discussed in detail above, it should be noted that the functionality described above may be implemented in mobile stations and base stations of a wireless communication system by providing suitable programs that are executed in the respective processing subsystems of these devices. The processing subsystems then control the processing of the data and transmission/receipt of the data by the respective transceiver subsystems of the mobile stations and base stations.

The program instructions are typically embodied in a storage medium that is readable by the respective processing subsystems. Exemplary storage media may include RAM memory, flash memory, ROM memory, EPROM memory, EEPROM memory, registers, hard disk, a removable disk, a CD-ROM, or any other form of storage media known in the art. Such a storage medium embodying program instructions for implementing the functionality described above comprises an alternative embodiment of the invention.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and method steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. It should also be noted that the illustrative components, blocks, modules, circuits, and steps may be reordered or otherwise reconfigured in alternative embodiments. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method, comprising:

determining a quality metric for each of a plurality of data streams based on different blocks of data for each data stream being permuted and transmitted over different ones of a plurality of antennas;

determining a condensed quality metric based on the quality metric for each of the plurality of data streams, wherein the condensed quality metric comprises a reference quality metric and at least one delta quality metric indicative of quality metrics for the plurality of data streams;

transmitting the condensed quality metric to a transmitter;

receiving the plurality of data streams transmitted over the plurality of antennas, the blocks of data from each of the plurality of data streams being permuted by transmitting different blocks of data from each data stream over different ones of the plurality of antennas, each data stream being transmitted at a data rate determined based on the condensed quality metric; and inversely permuting the plurality of data streams.

2. The method of claim 1, wherein the plurality of data streams are permuted in a pseudorandom pattern.

3. The method of claim 2, wherein the pseudorandom pattern comprises a full permutation of possible combinations of the plurality of data streams and the plurality of antennas.

4. The method of claim 1, further comprising decoding the plurality of data streams after the inverse permutation.

5. The method of claim 4, wherein the plurality of data streams are recovered using successive interference cancellation.

6. An apparatus, comprising:

means for determining a quality metric for each of a plurality of data streams based on different blocks of data for each data stream being permuted and transmitted over different ones of a plurality of antennas;

means for determining a condensed quality metric based on the quality metric for each of the plurality of data streams, wherein the condensed quality metric comprises a reference quality metric and at least one delta quality metric indicative of quality metrics for the plurality of data streams;

means for transmitting the condensed quality metric to a transmitter;

means for receiving the plurality of data streams transmitted over the plurality of antennas, the blocks of data from each of the plurality of data streams being permuted by transmitting different blocks of data from each data stream over different ones of the plurality of antennas, each data stream being transmitted at a data rate determined based on the condensed quality metric; and means for inversely permuting the plurality of data streams.

7. The apparatus of claim 6, wherein the plurality of data streams are permuted in a pseudorandom pattern.

8. The apparatus of claim 7, wherein the pseudorandom pattern comprises a full permutation of possible combinations of the plurality of data streams and the plurality of antennas.

9. The apparatus of claim 6, further comprising means for decoding the plurality of data streams after the inverse permutation.

10. The apparatus of claim 9, wherein the plurality of data streams are recovered using successive interference cancellation.

11. A mobile station for a wireless communication system comprising:

a processing subsystem configured to determine a quality metric for each of a plurality of data streams based on different blocks of data for each data stream being permuted and transmitted over different ones of a plurality of antennas, determine a condensed quality metric based on the quality metric for each of the plurality of data streams, wherein the condensed quality metric comprises a reference quality metric and at least one delta quality metric indicative of quality metrics for the plurality of data streams, send the condensed quality metric to a base station, receive the plurality of data streams transmitted over the plurality of antennas the blocks of data from each of the plurality of data streams being permuted by transmitting different blocks of data from each data stream over different ones of the plurality of antennas, each data stream being transmitted at a data rate determined based on the condensed quality metric, and inversely permute the plurality of data streams.

12. An apparatus, comprising:

a controller for determining a quality metric for each of a plurality of data streams based on different blocks of data for each data stream being permuted and transmitted over different ones of a plurality of antennas, for using a quality metric for a first data stream among the plurality of data streams as a reference, and for determining an auxiliary parameter for each remaining data stream among the plurality of data streams based on the quality metric for the remaining data stream and the quality metric for the first data stream;

a transmitter for transmitting the quality metric for the first data stream and the auxiliary parameter for each remaining data stream; and a receiver for receiving the plurality of data streams transmitted over the plurality of antennas channels at data rates determined based on the quality metric for the first data stream and the auxiliary parameter for each remaining data stream, each of the plurality of data streams comprising data blocks wherein the plurality of data streams are permuted by transmitting different blocks of data from each data stream over different ones of the plurality of antennas.

13. The apparatus of claim 12, wherein a data rate for each remaining data stream is determined based on the quality metric for the first data stream and the auxiliary parameter for the remaining data stream.

14. The apparatus of claim 12, wherein the auxiliary parameter for each remaining data stream comprises a difference between the quality metric for the first data stream and the quality metric for the remaining data stream.

15. A computer-program product for reducing the amount of uplink resources that are needed to provide channel performance feedback, the computer-program product comprising a non-transitory computer-readable medium having instructions for:

determining a quality metric for each of a plurality of data streams based on different blocks of data for each data stream being permuted and transmitted over different ones of a plurality of antennas;

determining a condensed quality metric based on the quality metric for each of the plurality of data streams, wherein the condensed quality metric comprises a reference quality metric and at least one delta quality metric indicative of quality metrics for the plurality of data streams;

transmitting the condensed quality metric to a transmitter;

receiving the plurality of data streams transmitted over the plurality of antennas the blocks of data from each of the plurality of data streams being permuted by transmitting different blocks of data from each data stream over different ones of the plurality of antennas, each data stream being transmitted at a data rate determined based on the condensed quality metric; and inversely permuting the plurality of data streams.

16. The method of claim 1, wherein the reference quality metric comprises a reference signal-to-noise ratio (SNR) and the at least one delta quality metric comprises a $\Delta$SNR value, and wherein a SNR for each data stream is determined based on the reference SNR plus a multiple of the $\Delta$SNR value.

* * * * *